3,559,500
BALL SCREW SHAFT
David A. Galonska and Dan R. Rowland, Saginaw, Mich., assignors to General Motors Corporation, Detroit, Mich., a corporation of Delaware
Filed Oct. 16, 1969, Ser. No. 867,009
Int. Cl. B23p 11/02; F16h 1/18
U.S. Cl. 74—424.8
3 Claims

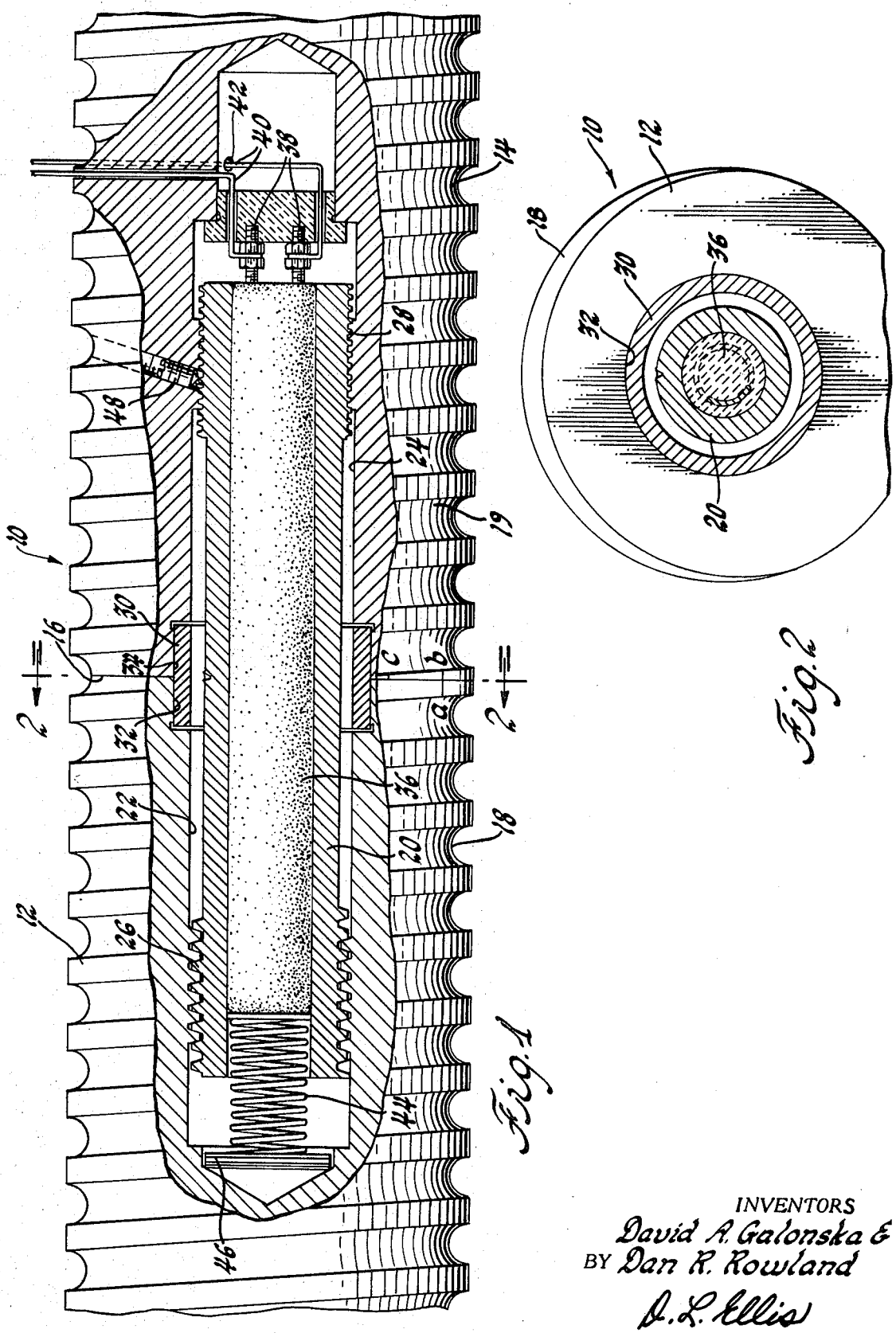

ABSTRACT OF THE DISCLOSURE

A long ball screw shaft unit is fabricated of a plurality of shaft sections in which each of the joints between adjacent sections is compression loaded during assembly through use of a thermal contraction process. The starts of the ball screw groove on adjacent shaft sections are ensured of alignment for groove continuity throughout the unit upon completion of the contraction process through use of internal tension members, each connected between adjacent sections by means of threads on opposite ends of the tension member formed with differing pitch.

---

This invention relates to long multisection shafts and more particularly to a multisection ball screw shaft.

It has been known in the past to provide firm joints between the abutted ends of sections of a shaft unit or the like by processes of thermal expansion and contraction. By such means unusually long shaft units may be fabricated from a plurality of sections which are amenable to the precise machining and handling during manufacture that would be impracticable were the unit to be manufactured in one piece.

The present invention provides such a multisection shaft unit wherein predetermined rotary relationship between the several sections may be established with the thermal expansion and contraction process. In its most specific aspects, the invention is concerned with maintaining precision continuity of a ball groove in a multisection ball screw shaft unit of unusually long proportion intended for use in such machinery as large milling machines and other oversized machine tools, missle erector and launchers, etc. The precision machining of the ball grooves required for such applications dictates the use of shaft sections of reasonable length commensurate with available economic plant space and tool size, yet the continuity of the ball groove and the other dimensional limitations on the unit should not suffer from the use of sections.

Accordingly, the primary object of this invention is to provide an improved overlong shaft unit which may be fabricated economically of several sections compression joined by thermal expansion and contraction.

Another object of this invention is to provide a threaded multisection shaft unit wherein continuity of the thread on the shaft unit may be precisely established at the completion of the thermal expansion and contraction process during manufacture.

A more specific object of this invention is to provide a multisection ball screw shaft unit adapted for compression joining of adjacent ends of several solid sections of the shaft through use of internal tension members extending across the joints between tension bearing threaded connections to the adjacent sections formed dissimilarly to enable threaded adjustment of the shaft sections on the tension member to the different axial spacings between the sections required during the contraction process while still precisely maintaining alignment between the starts of the ball grooves thereon.

These and other objects, features, and advantages of the invention will be readily apparent from the following specification and from the drawings wherein:

FIG. 1 is a partially broken-away elevational view of a multisection ball screw shaft according to this invention; and FIG. 2 is a sectional view taken generally along the plane indicated by lines 2—2 in FIG. 1.

Referring particularly to FIG. 1 of the drawings, the ball screw shaft unit is designated generally as 10, comprising at least two shaft sections 12 and 14. It is, of course, to be appreciated that many more than the two sections may be provided in accordance with the total length of unit required and that the joint provided between the two sections shown and described herein may be duplicated in each of the several joints entailed with additional sections. The shaft sections are of solid cross-section generally throughout their length, i.e., non-hollow, for maximum load carrying capacity.

The shaft sections 12 and 14 are joined together by a process, hereinafter described, of thermal expansion and contraction to provide a compression force across the joint of the abutted ends indicated at 16 of a predetermined value ensuring firm connection tolerant of the specified bending, tensile and torsional loads that may be encountered in use of the shaft unit. The two shaft sections have ball grooves 18 and 19 which are to be aligned by relative rotary adjustment between the sections for precise continuity over the length of the unit 10. Shaft unit 10 includes in contemplation of the thermal expansion and contraction process a hollow tension rod 20 received within aligned central bores 22 and 24 formed in the juxtaposed end portions of shaft sections 12 and 14. One end of tension rod 20 is provided with a thread conformation 26 of Acme or like form engaged with complementary threads formed on shaft section 12 internally thereof. The other end of the tension rod is provided with another thread conformation 28 also of Acme form engaged with threads formed interiorly of the shaft section 14. A pilot sleeve 30 is mounted within counterbores 32 and 34 of the shaft sections formed to ensure axial alignment of the two shaft sections during the assembly process.

Mounted within the central bore of the hollow tension rod 20 is a heating element 36 which may be of a known ceramic base type of material or alternatively a high output resistance heating metallic wire form type of element. Electrical terminals 38 on one end of element 36 connect via wires 40 which pass through radial bores 42 formed in shaft section 14 to connect with a suitable source of electrical potential which may be controlled to obtain a desired level of heating in the element 36. At the other end of the heating element, a coil compression spring 44 seats between the element and a thrust bearing assembly 46 seated on shaft section 12.

The two thread conformations 26 and 28 on the opposite ends of the tension rod 20 are of dissimilar formation. In the illustrated embodiment, they are both of right hand but formed with significantly differing pitch, i.e., threads 26 being relatively coarse and threads 28 being of relatively fine pitch. This differing pitch enables the alignment of the starts or the ends of the ball grooves 18 and 19 on shaft sections 12 and 14 to have precise continuity across joint 16 following the various steps performed during the joint-compressing thermal expansion and contraction assembly process to be described. It is to be noted that the dissimilarity of threads which enables the process may also be accomplished by using differing hand, with or without differing pitch.

The tension rod 20 is installed between the shaft sections 12 and 14 by threading one end of the tension rod into one of the shaft sections and threading the other shaft section over the other end of the tension rod and over the pilot sleeve 30 until the two juxtaposed ends of the shaft sections are abutted together. Should the starts of the ball grooves 18 and 19 not be properly aligned, one of the shaft sections may be threaded partially in a direction either further on to or off of the tension rod and the tension rod threaded into or out of the other shaft section a distance selected in accordance with the rotative error measured between the starts of the threads, thus partaking of the differing pitches of the thread conformations for adjustment between the parts until both the desired abutted axial and rotary relation therebetween is obtained. An indexing line $a$–$b$ is etched or otherwise scribed longitudinally across the joint as shown in FIG. 1. Shaft section 12 is then rotated on coarse threads 26 relative to the tension rod 20 and the shaft section 14 in a direction to create a predetermined axial gap between the ends of the shaft sections. Setscrews 48 may be provided to hold tension rod 20 in fixed relation with the shaft section 14 during this latter step. The predetermined axial gap is, of course, selected to provide a desired amount of compressive force between the shaft sections after the thermal expansion step, described hereinbelow, in accordance with the elastic tensile elongation characteristic of the material of tension rod 20. In practice, a compressive force of approximately 75,000 p.s.i. may be impressed between the shaft sections by establishing an initial gap therebetween of approximately .018 inches where the tension rod is made of beryllium copper material. Such material advantageously exhibits a high coefficient of thermal expansion as well as high tensile strength. Having established the gap, the index mark $a$ on shaft section 12 has been displaced upwardly as viewed in FIG. 1 from alignment with index mark $b$. At this new position another index mark $c$ is scribed on shaft section 14 in axial alignment with mark $a$. The shaft sections 12 and 14 are then threaded over tension rod 20 relatively of each other in a manner to close the gap therebetween and again establish firm abutment at joint 16, yet maintain index marks $a$ and $c$ in alignment. As indicated above for the initial assembly step this may be accomplished due to the differing pitches of threads 26 and 28 by selected threaded adjustment of all three of the parts 12, 14, and 20 relative to each other. Heating current is then applied to heating element 36 in quantity sufficient to cause the tension rod 20 to undergo thermal expansion axially of itself, carrying with it the two shaft sections 12 and 14 axially apart until the latter are again separated by a gap of at least .018 inch. With set screws 48 then set in firm contact between the shaft section 14 and tension rod 20, shaft section 12 is rotated over threads 26 until the index marks $a$ and $b$ are realigned bringing the starts of the ball grooves 18 and 19 into precise continuity. Heating element 36 is then allowed to cool, and the subsequent cooling of the tension rod 20 causes it to seek linear contraction which is, of course, resisted by the abutment of shaft sections 12 and 14 at joint 16. The result is a tensile stress through the tension rod 20 and a compression within the two shaft sections 12 and 14 between the thread conformations 26 and 28. The particular amounts of axial gap and resulting compression at joint 16 described herein are of course variable to suit the ultimate use conditions of unit 10 as well as the material type selected for tension rod 20. It will be appreciated that the use of the dissimilar threads 26 and 28 makes possible the selection of any initial required gap within the available range of the threads while still permitting the relatively easy alignment of the ball grooves 18 and 19 before and after the thermal expansion step.

Having thus described the invention, what is claimed is:

1. A multisection shaft adapted for compression joining of the juxtaposed end portions of adjacent sections thereof by thermal process comprising at least a pair of solid shaft sections, and a tension member extending between said shaft sections and having opposite ends each provided with thread means threadedly connected with one of said shaft sections, the thread means on said opposite ends of said tension member being of dissimilar formation enabling adjustment of said shaft sections on said tension member into a plurality of relative positions axially therealong to establish different amounts of axial spacing between the juxtaposed end portions of said shaft sections during the thermal process while maintaining a predetermined rotary relation therebetween.

2. A multisection screw shaft adapted for compression joining of the juxtaposed end portions of adjacent sections thereof by thermal contraction comprising at least a pair of screw shaft sections each provided with a thread thereon, and a tension member extending between said screw shaft sections and having opposite ends each provided with thread means threadedly connected with one of said screw shaft sections, the thread means on said opposite ends of said tension member being of differing pitch enabling adjustment of said screw shaft sections on said tension member into a plurality of relative positions axially therealong to establish different amounts of axial spacing between the juxtaposed end portions of said shaft sections while still maintaining a predetermined rotary relation between the starts of the threads on said end portions.

3. A multisection ball screw shaft adapted for compression joining of the juxtaposed end portions of adjacent sections thereof by thermal contraction comprising, at least a pair of generally solid ball screw shaft sections each having a ball groove therein, the juxtaposed end portions of said screw shaft sections being provided with aligned axial bores, a hollow tension member received within said axial bores of said screw shaft sections and being provided at said opposite ends thereof with thread means each threadedly engaged with a respective screw shaft section, the thread means on said opposite ends of said tension member being of differing pitch enabling adjustment of said shaft sections axially along said tension member to a plurality of relative positions to establish different amounts of axial spacing between the juxtaposed end portions of said screw shaft sections while maintaining a selected rotary relation between the starts of the ball grooves on the end portions of said screw shaft sections, and a heating element mounted interiorly of said hollow tension member and adapted for connection to a source of electrical current.

References Cited

UNITED STATES PATENTS

| 3,050,613 | 8/1962 | Sheinhartz et al. | 29—447X |
| 3,508,453 | 4/1970 | Good et al. | 74—441 |

LEONARD H. GERIN, Primary Examiner

U.S. Cl. X.R.

29—447